United States Patent [19]

Scholz

[11] 4,101,940
[45] Jul. 18, 1978

[54] CIRCUIT FOR DELAYING A COMPOSITE VIDEO SIGNAL BY A LINE DURATION, PARTICULARLY FOR USE WITH A VIDEO RECORD PLAYER

[75] Inventor: Werner Scholz, Gehrden, Germany

[73] Assignee: Ted Bildplatten Aktiengesellschaft AEG-Telefunken-Teldec, Switzerland

[21] Appl. No.: 753,620

[22] Filed: Dec. 23, 1976

[30] Foreign Application Priority Data

Dec. 23, 1975 [DE] Fed. Rep. of Germany ....... 2558168

[51] Int. Cl.$^2$ ............................................. H04N 5/79
[52] U.S. Cl. .................................................... 360/37
[58] Field of Search ....................... 358/8, 11, 21, 141, 358/148, 160; 360/33, 34, 37

[56] References Cited

U.S. PATENT DOCUMENTS 3,483,318 12/1969 Iwai et al. .............................. 360/37

Primary Examiner—Robert L. Richardson
Attorney, Agent, or Firm—McGlew and Tuttle

[57] ABSTRACT

A composite input video signal, having blanking intervals and including line sync pulses increasing the amplitude of the input signal, is applied to the circuit, is amplitude filtered, and is split into a BA-signal, which is fed to an adding stage, and line sync pulses which are fed to a monostable multivibrator which converts the line sync pulses into output pulses having an amplitude within the amplitude range of the filtered video signal, and these output pulses are also supplied to the adding stage. The output of the adding stage is applied to the input of a storage controlled by a timing pulse sequence from a timing pulse generator. The output pulses of the monostable multivibrator are supplied to a phase comparator having an input connected to the output of the storage through a gating device. The phase comparator supplies a variable to the timing pulse generator to control its frequency. The gating device transmits only during the line blanking interval A of the BA-signal, and thus transmits only the added multivibrator output pulses supplied to the input of the storage. The multivibrator output pulses and the video signal BA coincide, in time, at both the input and the output of the storage, so that the storage effects a delay exactly equal to the respective duration of a line.

11 Claims, 5 Drawing Figures

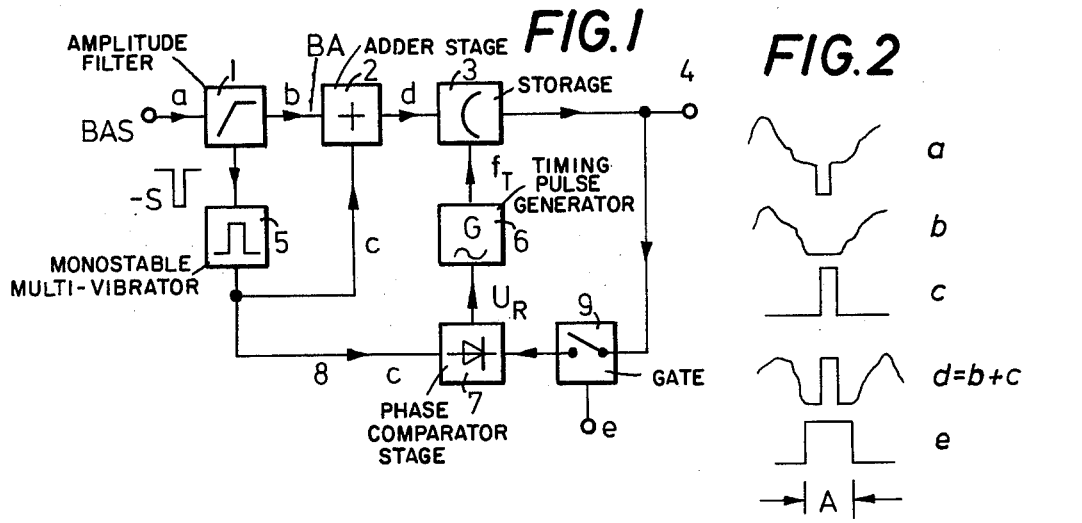
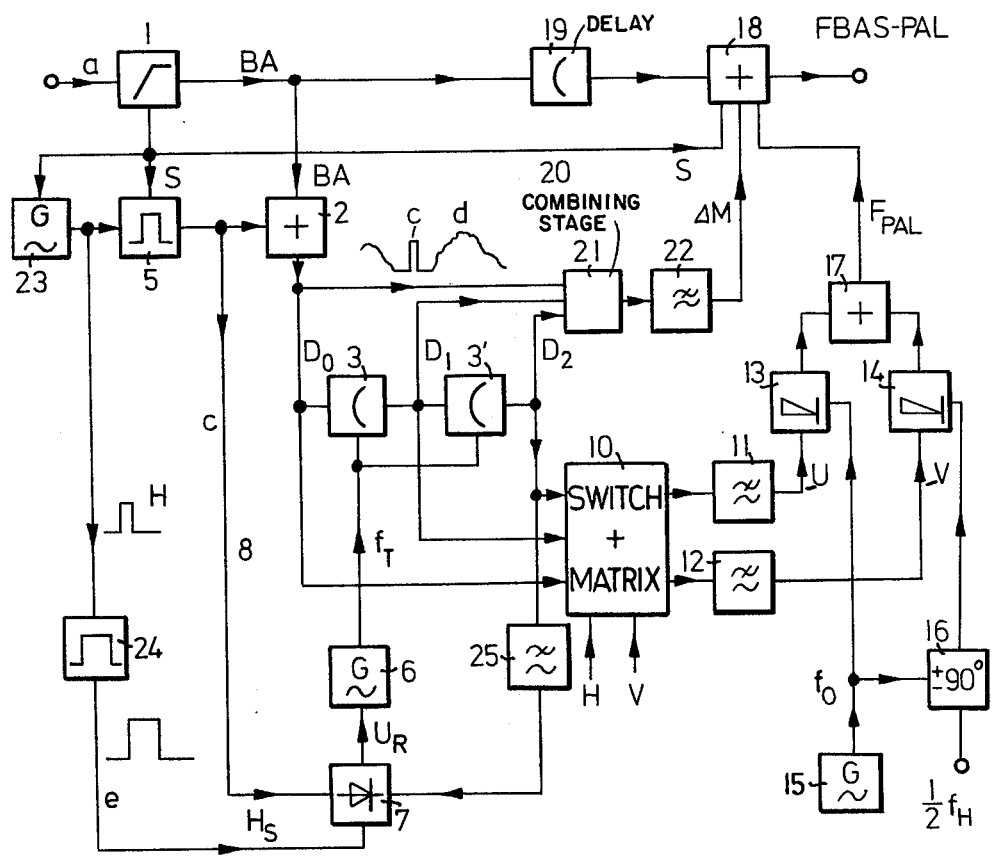

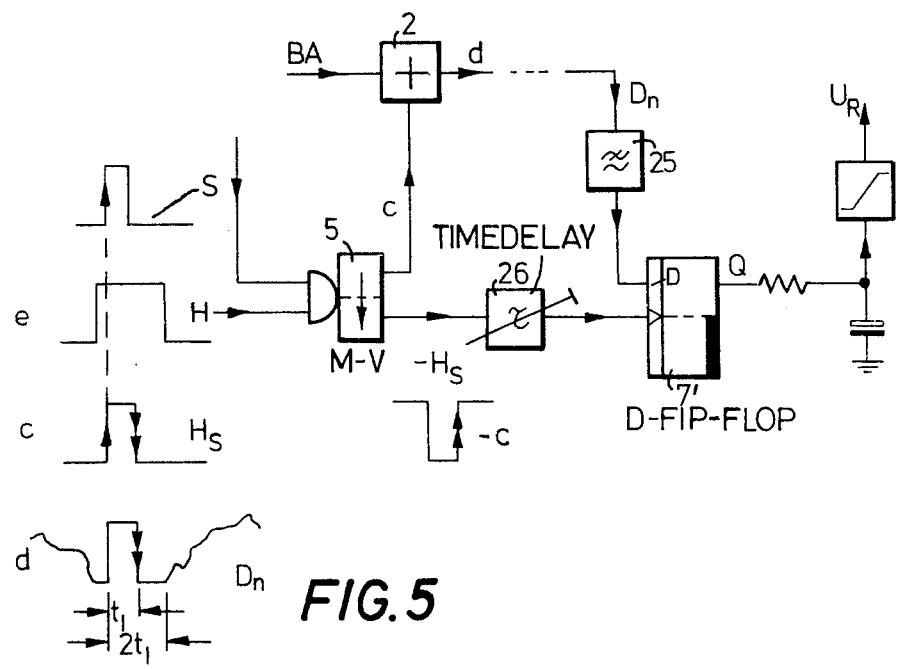

CIRCUIT FOR DELAYING A COMPOSITE VIDEO SIGNAL BY A LINE DURATION, PARTICULARLY FOR USE WITH A VIDEO RECORD PLAYER

FIELD AND BACKGROUND OF THE INVENTION

In television engineering, it is frequently necessary to delay a video signal by the duration of one or more lines, for example, for decoding a chrominance signal, in a PAL-decoder, in a SECAM-decoder, or in a video record player, during the reproduction of a color video signal recorded in trilinear sequence (German DAS No. 1,256,686).

If such a signal arrives from a recording device, the line duration of the signal can differ from the nominal value, due to the unavoidable speed fluctuations of the recording medium. A delay line with a constant delay time would then no longer delay the signal by the actual line duration, so that the delayed signals would no longer coincide, in time, with the undelayed signals. Thus, errors would appear, for example, in a reproduction circuit for a trilinear sequential signal.

It is known, from German Offenlegungsschrift No. 2,261,301, to use an electronically timed storage to effect the delay by a line duration, and whose delay time depends on the frequency of the timing pulses controlling the storage. By phase comparison of the line sync pulses at the input and output of the storage, there is obtained a manipulated variable which controls the frequency of a timing pulse generator, and thus the effective delay time of the storage, in a manner such that the delay time of the storage is always equal to the actual duration of the line, even if such actual duration differs from the nominal duration value. The effective delay time then is always equal to the actual, possibly varying, line duration. This adaptation is possible with an electronically timed storage, because the delay time of the latter can be varied by varying the frequency of the timing pulse sequence contolling the storage. However, in the presently used ultrasonic delay lines, such an adaptation is not possible.

The electronically timed storages, mentioned above, and which are known, in practice, for example, as bucket chain circuits or as CCD-circuits (charge coupled device), have a limited amplitude modulation range. Thus, they limit the amplitude of the signal passing through the storage, and thus also the S/N, or signal-to-noise ratio.

SUMMARY OF THE INVENTION

The invention is directed to the problem of increasing the maximum admissible amplitude of the information signal traversing the storage, and also of the S/N ratio. To this end, the invention is based on the following finding.

In a certain amplitude modulation range, a part of this available amplitude range is occupied by the line sync pulses which are outside the amplitude range of the BA-signal in the blacker than black region. Consequently, only a part of the available modulation range of the storage remains for the information signal proper, that is, the video signal B between black and white.

In accordance with the present invention, the line sync pulses are initially removed and corresponding pulses are inserted into the signal and which corresponding pulses are not outside the amplitude range of the BA-signal but rather within the amplitude range thereof. Thus, the entire modulation range of the storage is made available for the information signal, namely, the BA-signal. The pulses inserted to replace the line sync pulses can thus no longer be clipped from the delayed signal by amplitude selection, but these pulses still can be recovered, for the underlying circuit, by line selection, since the intervals, namely the line blanking intervals in which the pulses appear, are defined.

Another advantage of the invention is that a larger amplitude can be selected for the pulses used for phase comparison. In addition to this, the linearity is improved.

An object of the invention is to provide an improved circuit for delaying a composite video signal by the duration of a line.

Another object of the invention is to provide such a circuit in which the maximum admissible amplitude of the information signal traversing a storage is increased.

A further object of the invention is to provide such a circuit in which the maximum admissible amplitude of the S/N ratio is increased.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a block diagram of the principal circuit of the invention;

FIG. 2 shows curves illustrating the method of operation;

FIG. 3 is a block diagram of the entire reproduction circuit for use with a video record player;

FIG. 4 is a block diagram of the phase comparator circuit; and

FIG. 5 graphically illustrates the pulse relations in the circuit of FIG. 4.

DETAILED DESCRIPTION OF THE PREFERRED EMBODIMENTS

Before describing the invention in detail, it should be noted that the lower case letters in FIGS. 1 and 3 indicate at which points the voltages, shown in FIG. 2, appear.

Referring first to FIGS. 1 and 2, a composite input video signal BAS, having blanking intervals and including line sync pulses increasing the amplitude of the input signal, is supplied to an amplitude filter 1 which splits the input signal into the BA-signal, shown in FIG. 2 at $b$, and into the line sync pulses S. The BA-signal is supplied, through an adding stage 2 and an electronically timed storage 3, to an output terminal 4 where the BA-signal appears with a delay equal to the duration of one line.

The line sync pulses S are supplied to a monostable multivibrator 5 which generates new pulses $c$ from the leading edges of the line sync pulses S. Each new pulse $c$, starting with the leading edge of a line sync pulse S, has a constant duration and has an amplitude within the amplitude range of the BA-signal, that is, approximately between the values black and white. The output pulses $c$ from multivibrator 5 are added, in adding stage 2, to the BA-signal to form a video signal $d$. From FIG. 2, it will be noted that the amplitude range of signal $d$ is smaller than that of the original signal $a$, since the line sync pulse S extending beyond the amplitude range of the BA-signal, no longer exists in its original form. The modulation range of storage 3 thus can be utilized completely for the BA-signal, that is, with a defined amplitude modulation range of storage 3, the signal fed to storage 3 can have a greater amplitude so that the S/N ratio and the linearity are improved. In the same manner, the other sync pulses, such as tails and vertical sync pulses, are clipped from the input signal.

The control of electronically timed storage 3 is effected by a timing pulse sequence $f_T$ provided by a timing pulse generator 6. The frequency of timing pulse generator 6 is controlled by a maiipulated variable $U_R$ obtained in a phase comparator stage 7. To phase comparator stage 7, there are fed, on the one hand over a line 8, the pulses $c$ corresponding to the line sync pulses S and, on the other hand, the signal from the output of storage 3. However, since only the pulses $c$ from the video signal $d$ can be utilized for phase comparison, a gate 9 is connected between the output of storage 3 and the associated input of phase comparator stage 7. Gate 9 transmits, responsive to gating pulses $e$, only during the line blanking interval $a$, and thus transmits only pulses $c$, but not the video signal B. Pulses $e$ have a longer duration than pulses $c$ so that, even with time variations of pulses $c$, the latter are transmitted to phase comparator stage 7.

The manipulated variable $U_R$ varies the frequency of timing pulse sequence $f_T$, and thus the delay time of storage 3, in a manner such that the pulses $c$ in video signal BA coincide in time at both the input and the output of storage 3. That is, storage 3 effects a delay which exactly corresponds to the respective duration of the line. At the inputs of phase comparator stage 7, there thus appear two pulses $c$ corresponding respectively to two successive lines. In this respect, the circuit works like the circuit shown in German Offenlegungsschrift No. 2,261,301.

FIG. 3 illustrates a substantially known reproduction circuit for a trilinear-sequential color video signal, and which generates, from the trilinear sequential signal, a complete FBAS-PAL signal (FBAS is the composite color signal), when used with the circuit embodying the invention. The circuit shown in FIG. 3 includes two series-connected storages 3 and 3', as well as a circuit 10, with three switches operated by the line frequency and a matrix which supplies the color difference signals U and V, which latter are supplied to respective low-pass filters 11 and 12. Signals U and V are modulated, in respective modulators 13 and 14, on a color subcarrier generated in oscillator 15 with a frequency $f_O$ in AM (amplitude modulation) with subcarrier suppression for the modulator 14. For such suppression, the subcarrier is switched, by a phase inverter 16, by a half-line frequency breaking voltage in the phase from line-to-line, through ± 90°.

The modulated color subcarrier frequency output signals of modulators 13 and 14 are combined, in an adding stage 17, to form the modulated color subcarrier $F_{PAL}$, which is supplied to an adding stage 18. Through a delay line 19, provided for phase equalization, the BA signal, and thus the luminance signal, is supplied to adding stage 18. Adding stage 18 also has supplied thereto, over a line 20, the sync pulses S clipped in filter 1, and is further supplied with a luminance difference signal ΔM. The latter signal is obtained, in a known manner, by assembling the respective signals $D_0$, $D_1$ and $D_2$ from the input, center and end of the series-connected storages 3 and 3', in a combining stage 21, and its frequency is limited in a low pass filter 22.

The sync pulses S, from the output of filter 1, are supplied to a line oscillator 23, for example, a flywheel circuit, which generates line frequency pulses H forming an additional control for monostable multivibrator 5. The effect of this is that multivibrator 5 supplies a pure sequence of line frequency pulses of constant width, even during the vertical blanking interval. Multivibrator 5 is thus so blocked, by the pulses H of line frequency pulse oscillator 23, that the pulses coinciding with the line return are transmitted, and the pre-equalizing and post-equalizing pulses in between are suppressed.

In the arrangement of FIG. 3, gate 9 of FIG. 1, is omitted and, instead, phase comparator stage 7 is activated by pulses $e$ only during the line blanking interval A. Pulses $e$ are obtained from a pulse shaper 24 supplied with the line frequency pulses H. A low pass filter 25 connected between the output of storage 3' and the input of phase comparator 7, suppresses the timing frequency $f_T$ still contained in the signal and which arrives in the signal by the timing of storages 3, 3'.

FIG. 4 shows a particularly simple circuit for generating the manipulated variable $U_R$. Referring to FIG. 4, phase comparator stage 7' consists of a D-flip flop, by which there is obtained a high phase sensitivity and no gating pulses $e$ are required. Pulses $c$, with the constant width $t_1$, are generated in multivibrator 5 from the line sync pulses S, as previously described. A width $t_1$ preferably is so selected that the trailing edge of each pulse $c$ is midway between the leading edge of the associated line sync pulse S and the end of the H-blanking interval. Signal $D_n$, which has passed through one or more delay stages, is fed, through low pass filter 25, to the D-input of flip-flop 7'. The direct pulses $c$ arrive, through an adjustable pulse delay stage 26, at the synchronizing input of flip-flop 7', which latter is positively edge-triggered. Depending on whether the leading edge of a pulse $c$ coincides with a pulse $D_n$ or with a black value (zero) at the D-input, the Q-output of flip-flop 7' moves to either 1 or 0. After filtration and limitation, the manipulated control voltage $U_R$ is obtained. By limitation, the frequency range of synchronizing generator 6 must be so narrowed that the trailing edges of pulses $H_S$ can be displaced by only less than ± $t_1$, and signal $D_n$. This assures capture of the control circuit, and the adjustable pulse delay stage 26 asures exact phase equalization.

The control voltage $U_R$ obtained in phase comparator stage 7 can also be obtained from the signals ΔM, U or V behind low pass filters 22, 11 and 12. During the generation of these difference signals, pulses $c$ cancel each other out, so that no voltage is generated during line blanking intervals A with proper phase position. It is only in case of a phase deviation that narrow pulses appear which can be used for the generation of the manipulated variable $U_R$, since the polarity of these pulses depends on the direction of the phase deviation. The output voltages of low pass filters 22, 11 and 12 are gated only during line blanking intervals A, with a gate.

Pulses $c$, required only for phase comparison, are no longer present in signal ΔM fed to adding stage 18, due to the above-mentioned subtraction. Instead, the line sync pulses S, required for the standardized composite color signal, are supplied again, over line 20, to adding stage 18. This pulse mixture preferably is prepared by filter 1.

Since the pulses $c$ at the outputs of stages 22, 11 and 12 disappear with a properly balanced circuit, these pulses can be used for balancing the circuit. For this purpose, the pulses are zeroized. The circuit can also contain three storages 3 connected in series. The pulses used for phase comparison can be tapped at different points of the series-connected storages 3, for example, at the beginning and end of the first storage, at the beginning and end of the second storage, and at the beginning of the first storage and the end of the second storage, etc., since a storage is delayed by exactly the duration of one line and the pulses are equal, in time, at all points of the series-connection, if the circuit works properly. The pulses c extend preferably over the entire amplitude range between black and white of the BA-signal. However, they can also occupy only a part of this amplitude range.

While specific embodiments of the invention have been shown and described in detail to illustrate the application of the principles of the invention, it will be understood that the invention may be embodied otherwise without departing from such principles.

What is claimed is:

1. In a circuit for delaying a composite input video signal, having blanking intervals and including line sync pulses increasing the amplitude of the input signal, by the duration of at least one line, the circuit including a timed storage, having an input and an output, controlled by a timing pulse sequence from a generator, with a variable obtained, by phase comparison, from the input and output of the storage, and which controls the frequency of the timing pulse sequence in a manner such that the delay time is always equal to the actual duration of a line: the improvement comprising, in combination, means operable to separate the line sync pulses from the input signal and to feed the video signal, less the line sync pulses, to the input of said storage; means deriving, from the separated line sync pulses, pulses having an amplitude within the amplitude range of the video signal less the sync pulses and having a constant duration; and means adding the derived pulses, during the line blanking intervals, to the video signal fed to said storage.

2. In a circuit for delaying a composite input video signal, the improvement claimed in claim 1, in which said deriving means comprises a monostable multivibrator connected to said separating means and generating the derived signals from the leading edges of the line sync pulses clipped from the composite input video signal.

3. In a circuit for delaying a composite input video signal, the improvement claimed in claim 2, including a phase comparator stage having two inputs and an output; means connecting the output of said monostable multivibrator to one input of said phase comparator stage; and means connecting the output of said storage to the other input of said phase comparator stage and supplying, to said other input, only the derived pulses included in the output signal from the output of said storage, and effective for phase comparison.

4. In a circuit for delaying a composite input video signal, the improvement claimed in claim 3, including a gate connected between the output of said storage and said other input of said comparator stage; said gate being controlled by line frequency pulses to transmit only during line blanking intervals.

5. In a circuit for delaying a composite input video signal, the improvement claimed in claim 3, including means supplying line frequency pulses to said phase comparator stage and operable to control said phase comparator stage only during line blanking intervals.

6. In a circuit for delaying a composite input video signal, the improvement claimed in claim 3, in which said phase comparator stage is a D-flip-flop.

7. In a circuit for delaying a composite input video signal, the improvement claimed in claim 3, including a delay line connected in advance of one input of said phase comparator stage.

8. In a circuit for delaying a composite input video signal, the improvement claimed in claim 7, in which said delay line is a fixed delay line.

9. In a circuit for delaying a composite input video signal, the improvement claimed in claim 7, in which said delay line is an adjustable delay line.

10. In a circuit for delaying a composite input video signal, the improvement claimed in claim 1, including a subtraction stage connected to said storage and subtracting the video signals before and behind said storage; said subtraction stage generating a pulse signal; and means operable, during line blanking intervals, to generate, from said pulse signal, said variable.

11. In a circuit for delaying a composite input video signal, the improvement claimed in claim 1, in which the frequency range of said timing pulse sequence generator is so limited that the gated pulse edges of the delayed derived pulses always occur in the line blanking interval of the undelayed signal.

* * * * *